(12) United States Patent
Fan et al.

(10) Patent No.: US 10,926,198 B2
(45) Date of Patent: Feb. 23, 2021

(54) DEAERATION APPARATUS

(71) Applicants: BOE Technology Group Co., Ltd., Beijing (CN); Chengdu BOE Optoelectronics Technology Co., Ltd., Sichuan (CN)

(72) Inventors: Zhenrui Fan, Beijing (CN); Zhong Lu, Beijing (CN); Wenxuan Zhang, Beijing (CN); Li Xiong, Beijing (CN); Cheng Tang, Beijing (CN); Mingwen Wang, Beijing (CN); Jianbo Yang, Beijing (CN); Hongguang Yuan, Beijing (CN); Wei Lin, Beijing (CN); Donghua Jiang, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

( * ) Notice: Subject to any disclaimer, the term of this patent is extended or adjusted under 35 U.S.C. 154(b) by 411 days.

(21) Appl. No.: 15/770,301

(22) PCT Filed: Oct. 27, 2017

(86) PCT No.: PCT/CN2017/108034
§ 371 (c)(1),
(2) Date: Apr. 23, 2018

(87) PCT Pub. No.: WO2018/161608
PCT Pub. Date: Sep. 13, 2018

(65) Prior Publication Data
US 2019/0060792 A1 Feb. 28, 2019

(30) Foreign Application Priority Data

Mar. 6, 2017 (CN) .......................... 201710129832.7

(51) Int. Cl.
*B01D 19/00* (2006.01)
*D21D 1/20* (2006.01)
(Continued)

(52) U.S. Cl.
CPC ..... *B01D 19/0063* (2013.01); *B01D 19/0005* (2013.01); *B01D 19/0036* (2013.01);
(Continued)

(58) Field of Classification Search
CPC ............ B01D 19/0005; B01D 19/0036; B01D 19/0052; B01D 19/0063; D21D 1/20; D21D 5/26; G02F 1/1303; G02F 1/133723
See application file for complete search history.

(56) References Cited

U.S. PATENT DOCUMENTS

| 5,084,134 A | 1/1992 | Mattiussi et al. | |
|---|---|---|---|
| 6,336,739 B1 * | 1/2002 | Lee ..................... | B01F 1/0011 366/143 |
| 2008/0163752 A1 * | 7/2008 | Williams ........... | B01D 19/0078 95/30 |

FOREIGN PATENT DOCUMENTS

| CN | 201445833 U | 5/2010 |
|---|---|---|
| CN | 204208342 U | 3/2015 |

(Continued)

OTHER PUBLICATIONS

International search report dated Feb. 1, 2018 for corresponding application No. PCT/CN2017/108034 with English translation attached.
(Continued)

*Primary Examiner* — Cabrena Holecek
(74) *Attorney, Agent, or Firm* — Nath, Goldberg & Meyer; Joshua B. Goldberg

(57) ABSTRACT

This disclosure provides a deaeration apparatus comprising: a closable deaeration cavity configured to accommodate a
(Continued)

liquid to be deaerated; a heating member configured to heat the deaeration cavity; a temperature detection member configured to detect a temperature inside the deaeration cavity; and a controller configured to receive the temperature detected by the temperature detection member and control the heating member based on the temperature. When using in deaeration of a liquid, the deaeration apparatus of the disclosure can shorten the deaeration time and improve the deaeration efficiency of the liquid.

15 Claims, 2 Drawing Sheets

(51) Int. Cl.
*D21D 5/26* (2006.01)
*G02F 1/1337* (2006.01)
*G02F 1/13* (2006.01)

(52) U.S. Cl.
CPC ........... *B01D 19/0052* (2013.01); *D21D 1/20* (2013.01); *D21D 5/26* (2013.01); *G02F 1/1303* (2013.01); *G02F 1/133723* (2013.01)

(56) References Cited

FOREIGN PATENT DOCUMENTS

| | | |
|---|---|---|
| CN | 105363245 A | 3/2016 |
| CN | 105413248 A | 3/2016 |
| JP | 2005-262030 A | 9/2005 |
| JP | 2005262030 A | 9/2005 |

OTHER PUBLICATIONS

Office Action dated Mar. 6, 2019 issued in corresponding Chinese Application No. 201710129832.7.

* cited by examiner

DEAERATION APPARATUS

CROSS-REFERENCE TO RELATED APPLICATION

This is a National Phase Application filed under 35 U.S.C. 371 as a national stage of PCT/CN2017/108034, filed Oct. 27, 2017, an application claiming the priority of Chinese Patent Application No. 201710129832.7 submitted to the Chinese Intellectual Property Office on Mar. 6, 2017, the disclosure of which is incorporated herein in its entirety by reference.

TECHNICAL FIELD

The present disclosure relates to the technical field of liquid deaeration technology, and particularly relates to a deaeration apparatus.

BACKGROUND

High-viscosity liquids (e.g., polyimide alignment liquid) are used during the production of liquid crystal display panels. In order to obtain a better finished product effect, it is necessary to remove bubbles in the liquid.

However, the prior art has at least the problem that due to the high viscosity of the liquid to be deaerated, the deaeration time is longer when it is deaerated, thus resulting in a low deaeration efficiency.

SUMMARY

The present disclosure has been accomplished in order to at least partially solve the problems in the prior art. According to one aspect of the disclosure, there is provided a deaeration apparatus comprising:

a closable deaeration cavity configured to accommodate a liquid to be deaerated;

a heating member configured to heat the deaeration cavity;

a temperature detection member configured to detect a temperature inside the deaeration cavity; and a controller configured to receive the temperature detected by the temperature detection member and control the heating member based on the temperature.

The temperature detection member may include a plurality of temperature sensors configured to detect temperatures at different positions of the deaeration cavity.

The plurality of temperature sensors may be arranged in the deaeration cavity in a first direction.

The heating member may include one heating wire configured around the deaeration cavity to spiral up from a base of the deaeration cavity to heat the deaeration cavity as a whole.

The heating member may include a plurality of heating wires, the deaeration cavity includes a plurality of sub-regions, and each of the heating wires is configured to heat one of the sub-regions of the deaeration cavity.

The heating member may include a plurality of heating wires that are arranged sequentially in the first direction and extend in a second direction vertical to the first direction, the deaeration cavity includes a plurality of sub-regions, each of the heating wires is configured to heat one sub-region of the deaeration cavity, and one of the plurality of temperature sensors corresponding to the one sub-region detects a temperature of the one sub-region so that the temperature of the one sub-region is precisely controlled by the controller.

The deaeration cavity may have an inverted conical base provided with an outlet at the lowest point of the inverted conical base, and an inlet at a higher position than the outlet.

The inlet and the outlet may be provided with a bubble statistic member, respectively.

The deaeration apparatus may include an insulation layer disposed at an outer surface of the deaeration cavity.

The deaeration apparatus may further include a deaeration monitor member configured to monitor a deaeration state of the liquid within the deaeration cavity.

The deaeration monitor member may include an image capturing member configured to capture an image of the liquid within the deaeration cavity.

The deaeration monitor member may include an atmosphere analyzer configured to detect a gas content in the deaeration cavity.

The atmosphere analyzer may be an oxygen analyzer.

The deaeration apparatus may further include a stirring member disposed within the deaeration cavity and configured to stir the liquid to be deaerated.

The deaeration apparatus may further include a vacuum member configured to extract the gas from the deaeration cavity.

DETAILED DESCRIPTION

To improve understanding of the technical solution of the present disclosure for those skilled in the art, the present disclosure will now be described in detail in conjunction with the accompanying drawings and specific embodiments.

The exemplary embodiment of the disclosure provides a deaeration apparatus for deaeration of a liquid to be deaerated. The liquid to be deaerated may be a high-viscosity liquid such as a flexible polyimide material or paper pulp.

Figure 1:
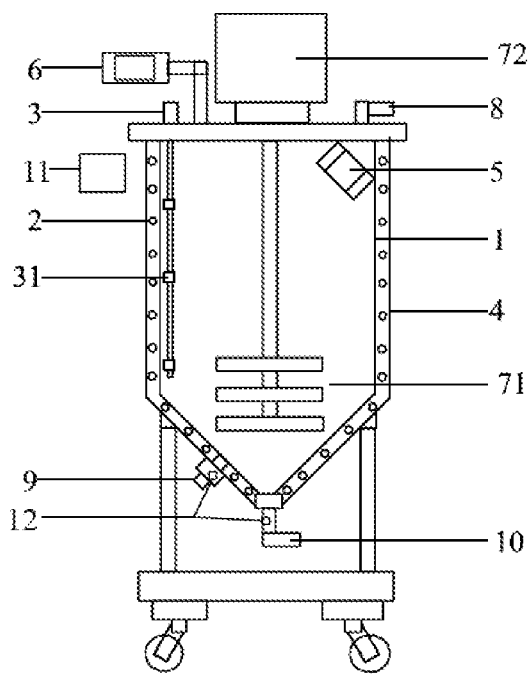
FIG. 1 is a structural schematic view showing the deaeration apparatus according to an exemplary embodiment of the disclosure.

FIG. 1 is a structural schematic view showing the deaeration apparatus according to an exemplary embodiment of the disclosure. According to one aspect of the disclosure, as shown in FIG. 1, the deaeration apparatus of the exemplary embodiment includes: a closable deaeration cavity 1 configured to accommodate a liquid to be deaerated; and a heating member 2 configured to heat the deaeration cavity 1.

In the exemplary embodiment of the disclosure, it should be understood that in order to better illustrate the relative positional relationship of various components of the deaeration apparatus, a first direction and a second direction are defined herein. Specifically, the first direction indicates a direction parallel to the vertical wall of the deaeration cavity 1 in FIG. 1, i.e., no matter how the deaeration apparatus (specifically the deaeration cavity 1) is placed, the first direction is always parallel to the wall. The second direction indicates a direction vertical to the first direction.

In the exemplary embodiment of the disclosure, after the liquid to be deaerated is transported into the deaeration cavity 1 via the inlet 9, the deaeration cavity 1 is closed. Then, the deaeration cavity 1 and thus the liquid within the deaeration cavity 1 are heated by the heating member 2. After deaeration, the liquid is discharged from the outlet 10.

In the exemplary embodiment of the disclosure, the deaeration cavity 1 has an inverted conical base. Specifically, as shown in FIG. 1, the inverted conical base is a lower portion of the deaeration cavity 1 that has an increasing cross-sectional area in the second direction from bottom to top along the first direction (the vertical direction in the case of FIG. 1). The inlet 9 and the outlet 10 are disposed at the inverted conical base, the outlet 10 is located at the lowest point of the inverted conical base, while the inlet 9 is located at a position higher than the outlet 10. With such arranged outlet 10, the deaerated liquid is ensured to be discharged completely. Compared with a case where additional bubbles may be introduced into the liquid to be deaerated when the liquid to be deaerated is introduced at an upper portion of the deaeration cavity 1, such arranged inlet 9 may cause the liquid to be deaerated to flow down along the wall of the inverted conical base when it begins to flow into the deaeration cavity 1 without introducing additional bubbles into the liquid to be deaerated. As the liquid to be deaerated accumulates in the deaeration cavity 1, the inlet 9 becomes below a surface of the liquid to be deaerated. In this case, continuing introduction of the liquid to be deaerated at the inlet 9 will not introduce any additional bubble into the liquid to be deaerated, either.

Figure 4:
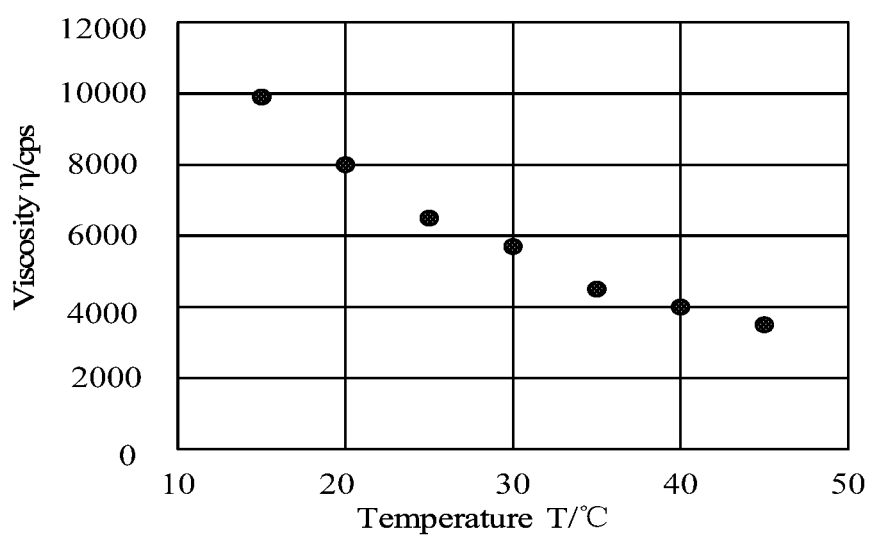
FIG. 4 is a schematic view showing a relationship between the viscosity of a mass-produced polyimide material and the temperature.

In addition, viscosity of the liquid is associated with temperature to some extent. As the temperature rises, the viscosity of the liquid will reduce (for example, FIG. 4 shows a relationship between the viscosity of a mass-produced polyimide material and the temperature). In addition, the rising velocity of bubbles in a liquid is inversely proportional to the viscosity of the liquid, i.e., the lower the viscosity of the liquid is, the higher the rising velocity of bubbles will be. Therefore, in the exemplary embodiment, by heating the liquid to be deaerated during the deaeration to reduce the viscosity thereof, overflow of the bubbles is facilitated and thus deaeration velocity of the liquid is increased.

In the exemplary embodiment of the disclosure, the position and specific form of the heating member 2 are not specifically defined as long as it can heat the deaeration cavity 1.

Figure 2:
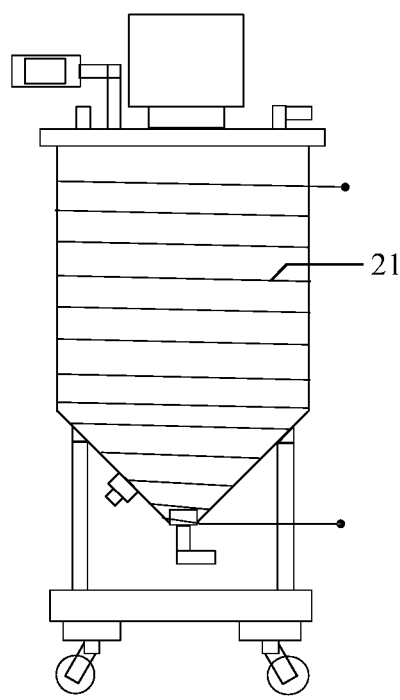
FIG. 2 is a schematic view showing an arrangement manner of the heating wire in the deaeration apparatus according to the exemplary embodiment of the disclosure.

FIG. 2 is a schematic view showing an arrangement manner of the heating wire in the deaeration apparatus according to the exemplary embodiment of the disclosure. As shown in FIG. 2, as a manner of the exemplary embodiment, the heating member 2 includes one heating wire 21 configured to heat the deaeration cavity 1 as a whole.

That is, as shown in FIG. 2, the heating member 2 may be provided with only one heating wire 21 which is disposed around the deaeration cavity 1 (e.g., buried in a side wall of the deaeration cavity 1), and spiraled up from a base of the deaeration cavity 1 to extend towards respective positions of the deaeration cavity 1. Thus, respective positions of the deaeration cavity 1 are heated together (i.e., heated as a whole) when heated by the heating wire 21. Such arrangement realizes a simplified structure and easy control.

Figure 3:
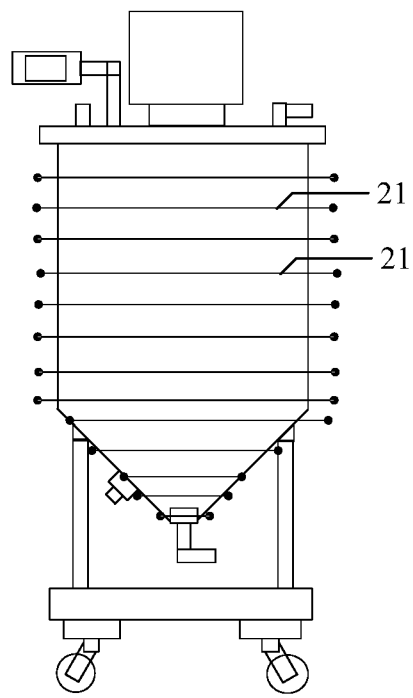
FIG. 3 is a schematic view showing another arrangement manner of the heating wire in the deaeration apparatus according to the exemplary embodiment of the disclosure.

FIG. 3 is a schematic view showing another arrangement manner of the heating wire in the deaeration apparatus according to the exemplary embodiment of the disclosure. As shown in FIG. 3, as another arrangement manner of the exemplary embodiment, the heating member 2 may include a plurality of heating wires 21, and the deaeration cavity 1 includes a plurality of sub-regions arranged in the first direction. Each of the sub-regions corresponds to the heating wires one by one, and each of the heating wires 21 is configured to heat a corresponding sub-region of the deaeration cavity 1.

That is, as shown in FIG. 3, the heating member 2 includes a plurality of heating wires 21, each of which winding around partial region of the deaeration cavity 1 (e.g., regions at different positions in the first direction) so that each of the heating wires 21 heats a corresponding partial region of the deaeration cavity 1 respectively during heating. Apparently, different heating wires 21 may be operated independently, i.e., whether to heat and at what heating temperature among the heating wires 21 are irrelevant to each other. Thus, the heating member 2 may use different heating wires 21 to heat different positions of the deaeration cavity 1 to different extents as needed (i.e., regional heating), so as to better meet the deaeration requirements. For example, if the liquid to be deaerated only occupies half of the deaeration cavity 1, the heating wires 21 at a lower portion of the deaeration cavity 1 may be operated to heat while the other heating wires 21 are not operated for heating.

It should be understood that the heating wires 21 may be arranged to cover the whole or partial region of the deaeration cavity 1 in a manner such as spirally winding, "S" shape, or a horizontal manner. The arrangement density of the heating wires 21 may be set according to the actual situation, and is not specifically defined herein.

In the exemplary embodiment of the disclosure, the deaeration apparatus further includes a temperature detection member 3 and a controller 11. The temperature detection member 3 is configured to detect a temperature inside the deaeration cavity 1 and feed the temperature back to the controller 11. The controller 11 is connected to the temperature detection member 3 and controls the heating member 2 based on the temperature detected by the temperature detection member 3.

The temperature detection member 3 detects the temperature inside the deaeration cavity 1, i.e., a deaeration temperature of the liquid to be deaerated in the deaeration cavity 1, in real time, and feeds it back to the controller 11. The controller 11 controls the heating member 2 based on the feedback deaeration temperature to precisely control the deaeration temperature so that the liquid to be deaerated is deaerated at an optimal deaeration temperature, thereby further improving the deaeration efficiency of the deaeration apparatus.

It should be noted that besides the temperature detected by the temperature detection member 3, the controller 11 may also control the heating member 2 with reference to factors such as material properties and viscosity of the liquid to be deaerated.

In the exemplary embodiment of the disclosure, the temperature detection member 3 includes a plurality of temperature sensors 31, such as armored thermocouples, fixed flange type temperature sensors, or thread fixed temperature sensors, configured to detect temperatures at different positions of the deaeration cavity 1.

Specifically, the temperature detection member 3 may include a plurality of temperature sensor 31. By disposing the temperature sensors 31 at different positions (e.g., positions at different levels) of the deaeration cavity 1, the temperature may be measured more precisely, thereby further improving the deaeration efficiency of the deaeration apparatus.

Obviously, the number and positions of the temperature sensors 31 may be determined according to actual requirements. For example, a plurality of temperature sensors 31 may be arranged at different positions of a vertical bar in the first direction, as shown in FIG. 1. Alternatively, the temperature sensors 31 may be disposed at an inner wall of the deaeration cavity 1. In addition, if the temperature sensors 31 are, for example, infrared temperature sensors, they may also be disposed outside the deaeration cavity 1 (obviously, the deaeration cavity 1 is provided with a widow for the infrared to pass through). Apparently, the temperature detection member 3 may also be other devices used for temperature measurement.

In the exemplary embodiment of the disclosure, the heating member 2 includes a plurality of heating wires 21 that are arranged sequentially in the first direction and extend in a second direction, and the deaeration cavity 1 includes a plurality of sub-regions arranged in the first direction. Each of the heating wires 21 is configured to heat one sub-region of the deaeration cavity 1. One of the plurality of temperature sensors 31 corresponding to the one sub-region detects a temperature of the one sub-region so that the temperature of the one sub-region is precisely controlled by the controller 11.

In the exemplary embodiment of the disclosure, the deaeration apparatus further includes an insulation layer 4 disposed at an outer surface of the deaeration cavity 1.

The insulation layer 4 (e.g., a rubber and plastic insulation layer or polyurethane insulation layer) is disposed at the outer surface of the deaeration cavity 1 to isolate or reduce heat transfer between the deaeration apparatus (including the deaeration cavity 1 and the heating member 2) and the outside, so as to reduce heat loss and save energy.

In the exemplary embodiment of the disclosure, the deaeration apparatus further includes a deaeration monitor member configured to monitor a deaeration state of the liquid within the deaeration cavity 1.

The deaeration state (bubble content in the liquid) of the liquid within the deaeration cavity 1 may be obtained in real time by the deaeration monitor member so as to adjust the deaeration temperature or time of the deaeration apparatus according to the state, thus avoiding unnecessary waste of resources.

In the exemplary embodiment of the disclosure, the deaeration apparatus includes an image capturing member 5 configured to capture an image of the liquid within the deaeration cavity 1.

The deaeration state of the liquid may be determined visually according to the image captured by the image capturing member 5. For example, when the deaeration is finished, there will be no bubble seen in the liquid in the captured image.

In the exemplary embodiment of the disclosure, the image capturing member 5 may be a camera which captures a video or photo of the liquid state within the deaeration cavity 1 in real time. Further, the camera is also provided with an illuminating means (such as a LED light) to make the captured image clearer. Apparently, the specific arrangement manner of the image capturing member 5 of the exemplary embodiment is not limited in the deaeration cavity 1. For example, the image capturing member 5 may also be disposed outside the deaeration cavity 1 and capture an image inside of the deaeration cavity 1 through a transparent window at a wall of the deaeration cavity 1; or the image capturing member 5 may be disposed at the base of the deaeration cavity 1 to capture an image inside the liquid.

In the exemplary embodiment of the disclosure, the deaeration monitor member further includes an atmosphere analyzer 6 configured to detect a gas content in the deaeration cavity 1.

Apparently, bubbles deaerated from the liquid will enter an upper portion of the deaeration cavity 1. Thus, during the deaeration process, the gas content in the deaeration cavity 1 will vary with the bubble content in the liquid. For example, without vacuuming, the gas content in the deaeration cavity 1 will increase as the bubbles get deaerated, and keep steady after the deaeration is finished. As another example, during deaeration with vacuuming, a steady small amount of gas (because the gas cannot be extracted out instantly) will be contained in the deaeration cavity 1 as the bubbles get deaerated, and after the deaeration is finished, the gas content in the deaeration cavity 1 will keep steady at a lower level. Therefore, in the exemplary embodiment, the atmosphere analyzer 6 analyzes and detects the gas content (which may be a content of a certain composition gas in the gas) in the deaeration cavity 1 to determine whether the deaeration is completed.

In the exemplary embodiments of the disclosure, the atmosphere analyzer 6 is an oxygen analyzer.

Bubbles are usually caused by transportation shocks and other factors in the atmosphere. Therefore, the gas compositions in the bubbles are the same as the atmospheric compositions, that is, mainly containing oxygen, nitrogen, and the like. Therefore, in the exemplary embodiment, an oxygen analyzer is used as the atmosphere analyzer 6 to analyze and detect the oxygen content in the deaeration cavity 1 to determine whether the deaeration is completed.

Apparently, the atmosphere analyzer 6 may be arranged in various manners. For example, the atmosphere analyzer 6 may be disposed outside the deaeration cavity 1 but in communication with an interior of the deaeration cavity 1, as shown in FIG. 1; or the atmosphere analyzer 6 may be directly disposed inside the deaeration cavity 1.

In the exemplary embodiment of the disclosure, the inlet 9 and the outlet 10 are provided with a bubble statistic member 12, respectively. When the liquid to be deaerated is introduced into the deaeration cavity 1 by the inlet 9, the bubble statistic member 12 at the inlet 9 detects and counts an amount of bubbles in the liquid to be deaerated passing through the inlet 9. When the liquid to be deaerated is discharged out of the deaeration cavity 1 by the outlet 10, the bubble statistic member 12 at the outlet 10 detects and counts an amount of bubbles in the deaerated liquid passing through the outlet 10. By comparing the amounts of bubbles in the liquid before and after the deaeration, the deaeration rate and thus whether the deaeration is completed can be determined. In the exemplary embodiment of the disclosure, the bubble statistic member 12 may be a counter, a counting sensor or a counting circuit.

In the exemplary embodiment of the disclosure, the deaeration apparatus further includes: a stirring member disposed within the deaeration cavity 1 and configured to stir the liquid to be deaerated; and a vacuum member 8 configured to extract the gas from the deaeration cavity 1.

The deaeration apparatus of the exemplary embodiment is provided with a stirring member therein, which stirs the liquid to be deaerated during the deaeration to facilitate floating of the bubbles. Specifically, the stirring member includes a stirrer 71 and a motor 72. The motor 72 drives the stirrer 71 to rotate, so as to stir the liquid to be deaerated.

Apparently, the stirring member may be arranged in various ways. For example, the stirrer 71 may protrude from above the deaeration cavity 1, as shown in FIG. 1; or the stirrer 71 may be directly inserted into the liquid from below the deaeration cavity 1 (obviously, the motor 72 is correspondingly disposed below the deaeration cavity 1).

In the exemplary embodiment of the disclosure, the deaeration apparatus may be further provided with a vacuum member 8 (such as a vacuum pump or an opening connected to a vacuum pump). The vacuum member 8 is configured to extract the gas from the deaeration cavity 1 to keep the deaeration cavity 1 at a low air pressure (approximately vacuum) inside, so as to facilitate floating of the bubbles in the liquid.

In the exemplary embodiments of the disclosure, the vacuum member 8 may be used in cooperation with the atmosphere analyzer 6. As discussed above, after vacuuming the deaeration cavity 1 by the vacuum member 8, the atmosphere analyzer 6 analyzes and detects the gas content (which may be a content of a certain composition gas in the gas) in the deaeration cavity 1 to determine whether the deaeration is completed.

The deaeration apparatus of the exemplary embodiment includes a closable deaeration cavity 1 and a heating member 2. During the deaeration process, the deaeration cavity 1 and thus the liquid to be deaerated within the deaeration cavity 1 are heated by the heating member 2 so that the viscosity of the liquid to be deaerated reduces as the temperature rises, thus facilitating overflowing of the bubbles and increasing the deaeration velocity. With the deaeration apparatus of the exemplary embodiment, the deaeration time of the liquid, especially a liquid with high viscosity, during deaeration of the liquid is shortened, and the deaeration efficiency is improved.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A deaeration apparatus comprising:
   a closable deaeration cavity configured to accommodate a liquid to be deaerated;
   a heating member configured to heat the deaeration cavity;
   a temperature detection member configured to detect a temperature inside the deaeration cavity; and
   a controller configured to receive the temperature detected by the temperature detection member and control the heating member based on the temperature,
   wherein the heating member includes one heating wire configured around the deaeration cavity to spiral up from a base of the deaeration cavity to heat the deaeration cavity as a whole.

2. The deaeration apparatus according to claim 1,
   wherein the temperature detection member includes a plurality of temperature sensors configured to detect temperatures at different positions of the deaeration cavity.

3. The deaeration apparatus according to claim 2,
   wherein the plurality of temperature sensors are arranged in the deaeration cavity in a first direction.

4. The deaeration apparatus according to claim 3,
   wherein the heating member includes a plurality of heating wires that are arranged sequentially in the first direction and extend in a second direction, the deaeration cavity includes a plurality of sub-regions, each of the heating wires is configured to heat one sub-region of the deaeration cavity, and one of the plurality of temperature sensors corresponding to the one sub-region detects a temperature of the one sub-region so that the temperature of the one sub-region is precisely controlled by the controller.

5. The deaeration apparatus according to claim 1,
   wherein the heating member includes a plurality of heating wires, the deaeration cavity includes a plurality of sub-regions corresponding to the heating wires one by one, and each of the heating wires is configured to heat a sub-region of the deaeration cavity corresponding to the heating wire.

6. The deaeration apparatus according to claim 1,
   wherein the deaeration cavity has an inverted conical base provided with an outlet at the lowest point of the inverted conical base, and an inlet at a higher position than the outlet.

7. The deaeration apparatus according to claim 6,
   wherein the inlet and the outlet are provided with a bubble statistic member, respectively.

8. The deaeration apparatus according to claim 1, further comprising:
   an insulation layer disposed at an outer surface of the deaeration cavity.

9. The deaeration apparatus according to claim 1, further comprising:
   a deaeration monitor member configured to monitor a deaeration state of the liquid within the deaeration cavity.

10. The deaeration apparatus according to claim 9,
    wherein the deaeration monitor member comprises:
    an image capturing member configured to capture an image of the liquid within the deaeration cavity.

11. The deaeration apparatus according to claim 9,
    wherein the deaeration monitor member comprises:
    an atmosphere analyzer configured to detect a gas content in the deaeration cavity.

12. The deaeration apparatus according to claim 11,
    wherein the atmosphere analyzer is an oxygen analyzer.

13. The deaeration apparatus according to claim 11, further comprising:
    a vacuum member configured to extract a gas from the deaeration cavity.

14. The deaeration apparatus according to claim 1, further comprising:
    a stirring member disposed within the deaeration cavity and configured to stir the liquid to be deaerated.

15. The deaeration apparatus according to claim 1, further comprising:
    a vacuum member configured to extract a gas from the deaeration cavity.

* * * * *